(12) United States Patent
Trussell, Jr.

(10) Patent No.: US 6,914,928 B2
(45) Date of Patent: Jul. 5, 2005

(54) DIODE ARRAY END PUMPED SLAB LASER

(75) Inventor: C. Ward Trussell, Jr., Woodbridge, VA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 83 days.

(21) Appl. No.: 09/879,928

(22) Filed: Jun. 14, 2001

(65) Prior Publication Data

US 2002/0191664 A1 Dec. 19, 2002

(51) Int. Cl.⁷ .............................................. H01S 3/091
(52) U.S. Cl. .............................. 372/71; 372/10; 372/21; 372/72; 372/75; 372/101
(58) Field of Search ............................. 372/71, 10, 21, 372/72, 75, 101

(56) References Cited

U.S. PATENT DOCUMENTS

| | | | | |
|---|---|---|---|---|
| 5,139,609 A | * | 8/1992 | Fields et al. | 372/50 |
| 5,790,574 A | * | 8/1998 | Rieger et al. | 372/25 |
| 6,026,101 A | * | 2/2000 | Suzudo et al. | 372/22 |
| 6,039,632 A | * | 3/2000 | Robertson | 451/41 |
| 6,387,059 B1 | * | 5/2002 | Marchitto et al. | 600/573 |

* cited by examiner

*Primary Examiner*—Tom Thomas
*Assistant Examiner*—Matthew E. Warren
(74) *Attorney, Agent, or Firm*—Arthur K. Samora; Wiilaim H. Anderson

(57) ABSTRACT

A diode pumped solid state laser using a laser diode bar or a stack of bars with cylindrical lenses is used to end pump a rectangular cross section solid state laser slab. The combination of lenses and polished slab surfaces provides overlap of the pump light with the laser mode combined with sufficient length of material to absorb all of the pump light to produce a compact, efficient laser source.

6 Claims, 1 Drawing Sheet

DIODE ARRAY END PUMPED SLAB LASER

BACKGROUND OF THE INVENTION

1. Field of the Invention

The present invention generally relates to diode lasers and more specifically, to end pump configurations and techniques for diode array end pumped slab lasers.

2. Description of Prior Art

Current lasers used in rangefinders are either low repetition rate or too expensive for many applications. Diode pumped solid lasers lead to more efficient operation and therefore can be smaller and lightweight, but often do not operate over environmental temperature ranges without inefficient and cumbersome temperature control. Military lasers are required to be low cost, compact, and operate over a wide temperature range. Previously designed diode pumped solid state lasers have used transverse pumping techniques which are effective, but require temperature control and are less efficient than desired. Previous end pumped lasers used cylindrical rods and thus did not have efficient mode/pump overlap. Previously used flashlamp pumped solid state lasers are limited in repetition rate due to excessive heating and in addition have a shorter operating time before replacement of the flashlamp pumps. There is a need for smaller, more efficient, lower cost lasers which are capable of moderate repetition rate operation for military applications such as laser rangefinders and target illuminators.

While the prior art has reported using solid state end pumped lasers none have established a basis for a specific apparatus and technique that is dedicated to the task of resolving the particular problem at hand. What is needed in this instance is a new apparatus and technique that insures that most of the pump light will be absorbed and coupled into the laser mode even if the absorption coefficient is low resulting in a laser that will operate efficiently over a wide temperature range even as the laser diode pump wavelength varies.

SUMMARY OF THE INVENTION

It is therefore one object of the invention to provide a apparatus and technique that insures that most of the pump light will be absorbed and coupled into the laser mode even if the absorption coefficient is low resulting in a laser that will operate efficiently over a wide temperature range even as the laser diode pump wavelength varies.

According to the invention, there is disclosed a diode array end pumped slab laser and technique. A laser diode having at least one diode bar for providing laser pump light in a vertical and horizontal direction to the optical axis is provided. A first cylindrical lens collimates the laser pump light in said vertical direction. A second cylindrical lens perpendicular to the first cylindrical lens collects the laser pump light output from the first cylindrical lens and focuses it onto a laser slab as focused laser pump light. A laser cavity includes a laser slab of solid state crystal. The slab accepts as input the focused laser pump light at a polished input side with unabsorbed pump light reflected within the laser slab and outputting from said polished output side absorbed laser energy. The laser pump light remains collimated perpendicular throughout the laser slab and the pump light further includes laser mode overlap for all of the laser slab length.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
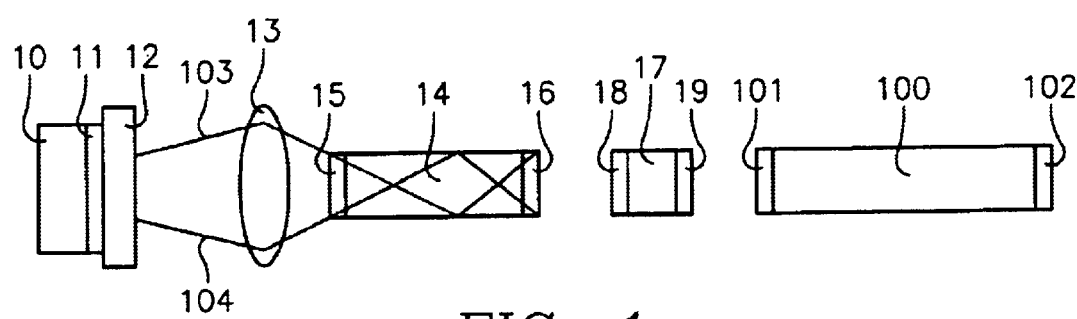
FIG. 1 is a top cross-sectional view of the invention.
Figure 2:
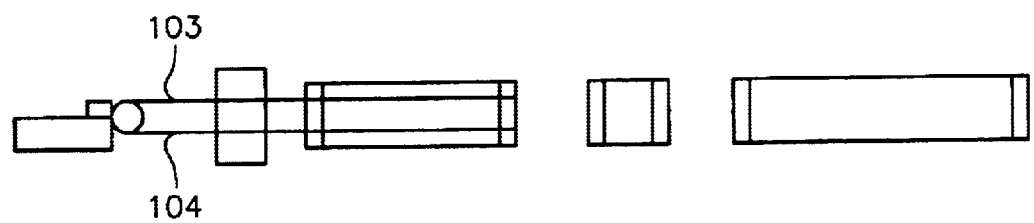
FIG. 2 is a cross-sectional side view of the invention.

Referring now to the drawings, and more particularly to FIG. 1, there is shown a top cross-sectional view of the diode array end pumped slab laser. Laser diode 10 includes bar 11 with first lens 12 and a second cylindrical optic 13. A laser diode bar is known in the art as a linear diode array containing multiple emitters. Rectangular solid state laser crystal 14 with dichroic coatings 15 and 16, an optional intercavity Q-switch 17 with dichroic coatings 18 and 19, and an optional OPO 100 with dichroic coatings 101 and 102. A passive or active Q-switch can be placed in a laser cavity for producing short, high peak power pulses. Second cylindrical lens 13 perpendicular to the first lens collects the light in the horizontal direction and focuses the light into slab 14. Pump light 103 and 104 is trapped in the horizontal plane, as shown in FIG. 2, through total internal reflection and bounces between the polished sides of the slab while being absorbed by the active laser ion in the crystal. FIG. 2, as a cross-sectional side view of FIG. 1, shows that the pump light remains collimated in the vertical direction to less that 1 mm for each laser diode bar while traveling down the length of the slab 14.

The use of a nonlinear crystal such as an OPO or raman oscillator material can be placed either within the laser cavity or external to the laser cavity to produce additional wavelengths as desired. If an internal cavity OPO is used, then dichroic optical coatings are placed to provide high reflectivity at the laser wavelength and partially reflecting at the wavelengths produced by the OPO. When configured with an intercavity OPO, a 1.5 micron laser is effected with coating 15 being a HT 800 nm and HR 1 micron type and coating 16 being a HT 1 micron and HR 800 nm type. Coatings 18 and 19 are both HT 1 micron types for the intercavity OPO configuration. Coatings 101 is a HT 1 micron and HR 1.5 micron and coating 102 is a HR 1 micron and PR 1.5 micron type coating, both for the intercavity OPO configuration.

When configured with an external OPO, a 1.0 micron laser is effected with coatings 15 and 16 being identical to the intercavity OPO configuration. Coatings 18 and 19 are an HT 1 micron and PR 1 micron coatings respectively. Coating 101 is HT 1 micron and HR 1.5 microns and coating 102 is HR 1 micron and PR 1.5 microns for the external OPO configuration. When OPO 100 is not used, a 1 micron laser is effected with coating 15 being a HT 800 nm and HR 1 micron and coating 16 as a HT 1 micron and HR 800 nm coating. Coatings 18 and 19 are a HT 1.06 micron and PR 1 micron type respectively.

The design is different from previous end pumped lasers because of the geometry used for coupling of the diode array light into the slab to match the laser cavity mode. In this design, the pump light is colliminated into a thin beam of light perpendicular to the plane of the laser diode bar using a cylindrical rod lens. A second crossed cylindrical lens is then used to collect the light in the plane of the bar and focus the light into the end of the solid state laser slab. Inside of the slab, the light remains collimated in the plane perpendicular to the bar and is trapped in the orthogonal plane by total internal reflection in the slab. This approach should be scalable from low to moderate average powers by increasing the number of diode array bars and the cross section of the solid state laser slab.

The pump light and the laser mode overlap for the entire length of the solid state laser slab. This insures that most of the pump light will be absorbed and coupled into the laser mode even if the absorption coefficient is low. This means that the laser will operate efficiently over a wide temperature range even as the laser diode pump wavelength varies. The advantage of this end pumping method is the superior overlap of pump light with the cavity mode and a long absorption depth for the pump light The preferred embodiment of the invention utilizes a single laser diode bar at 100 W, 500 $\mu$s pumping a Nd:YLF solid state laser at 50 mJ. A 10–20% optical to optical efficiency yields a 5–10 mJ at 1.047 $\mu$m. A 20% OPO conversion gives a 1–2 MJ at 1.5 $\mu$m. Electrical power at 5 Hz is approximately 750 milliwatts. The solid state laser slab is fabricated so that two opposite sides are polished and the other 2 opposite sides are rough ground. The polished sides allow the pump light to be reflected down the length of the slab. The opposite sides are rough ground to reduce parasitic laser oscillations perpendicular to the desired laser mode which is along the length of the slab. The solid state laser slab has dichroic optical coatings at both the pump end of the slab and the laser output end of the slab. The pump end is coated so it is highly transparent at the pump wavelength and highly reflective at the solid state laser wavelength. The output end of the slab is highly transparent at the solid state laser wavelength and highly reflective at the pump wavelength so that unabsorbed pump light can be reflected and be absorbed on the second pass.

The laser cavity can also contain other elements such as a passive or active Q-switch to produce high power pulses and an optical parametric oscillator or frequency doubler crystal to shift the output wavelength. This design should produce high efficiency which will lead to smaller batteries or power supply current. In addition, the longer absorption length means that the laser will operate efficiently over a wide temperature range which is critical for U.S. Army applications. Temperature control elements such as refrigerators and TE coolers will not be required leading to good efficiency and low cost. These lasers are needed for gated illumination, rangefinders, and ladar systems. The invention may utilize a laser diode bar or arrays for end pumping any 4-level solid state laser.

While this invention has been described in terms of preferred embodiment consisting of a laser configuration and technique, those skilled in the art will recognize that the invention can be practiced with modification within the spirit and scope of the appended claims.

Having thus described my invention, what I claim as new and desire to secure by Letters Patent is as follows:

1. A diode pumped multiple mode slab laser comprising:
   a laser diode for providing diode laser pump light in a vertical and horizontal direction to an optical axis, and over a wide range of temperatures, said diode laser pump light having a pump light wavelength, said laser diode being installed in said laser without a temperature control system so that said pump light wavelength varies according to temperature;
   a first cylindrical lens for collimating said diode laser pump light in said vertical direction on said optical axis;
   a second cylindrical lens on said optical axis perpendicular to and after said first cylindrical lens for collecting said diode laser pump light from said first cylindrical lens for further focusing into a laser cavity;
   said laser cavity on said optical axis after said second cylindrical lens, and comprising a laser slab of solid state crystal with a length and polished input and output ends, and further having a rectangular cross-section with rough ground top and bottom surfaces and polished side surfaces, said laser slab accepting as input said diode laser pump light at said polished input end with unabsorbed diode laser pump light being reflected within the laser slab off said polished side surfaces for efficient pump light absorption along all of said laser slab length and multiple mode lasing as said pump light wavelength varies according to temperature, said polished output end outputting absorbed laser energy.

2. The diode pumped multiple mode slab laser of claim 1 wherein said laser cavity further includes a Q-switch having input and output ends on the optical axis, with dichroic coatings at said input end output ends, said Q-switch for producing peak power pulses.

3. The diode pumped multiple mode slab laser of claim 1 wherein said laser cavity further includes a non-linear crystal to produce additional wavelengths.

4. The diode pumped multiple mode slab laser of claim 1 wherein there is further included a non-linear crystal after said laser cavity on the optical axis to produce additional wavelengths.

5. A lasing technique for generating a laser beam over a wide range of temperatures using diode pump light, said technique comprising the steps of:
   providing a laser diode without a temperature control system;
   generating said diode pump light in a vertical and horizontal direction to the optical axis with said laser diode, said diode pump light having a pump light wavelength that varies according to temperature;
   collimating said diode pump light in said vertical direction with a first cylindrical lens;
   receiving said laser pump light from said first cylindrical lens with a second cylindrical lens positioned between said first cylindrical lens and said laser slab;
   affording a laser slab having a length, an input end, an output end, and a rectangular cross-section with a top surface, a bottom surface and opposing side surfaces;
   polishing said side surfaces; and,
   focusing said laser pump light into said input end with second cylindrical lens so that said laser pump light remains collimated perpendicular throughout said laser slab, and further so that said laser pump light reflects off said side surfaces throughout said length of said laser slab to allow for more efficient lasing in multiple modes as said diode pump light wavelength varies according to temperature.

6. A diode pumped multiple mode slab laser adapted to operate over a wide range of temperatures comprising:
   at least one diode bar for providing diode laser pump light in a vertical and horizontal direction to the optical axis, said diode laser pump light having a pump light wavelength, said diode bar being included in said laser without a temperature control system so that said pump light wavelength varies according to temperature;
   a first cylindrical lens for collimating said diode laser pump light in said vertical direction on said optical axis after said laser diode bar;
   a second cylindrical lens on said optical axis perpendicular to and after said first cylindrical lens for receiving said diode laser pump light from said first cylindrical lens for further direction into a laser slab;

said laser slab having a length and polished input and output ends, and further having a rectangular cross-section with rough ground top and bottom surfaces and polished side surfaces to establish laser mode overlap and laser pump light absorption along all of said length; and, said side surfaces reflecting pump light back into said laser slab to allow for more efficient lasing in multiple modes as said pump light wavelength varies according to temperature.

* * * * *